United States Patent
Fukuda

(10) Patent No.: US 11,480,242 B2
(45) Date of Patent: Oct. 25, 2022

(54) FATIGUE DAMAGE DEGREE ESTIMATION DEVICE AND METHOD

(71) Applicant: ISUZU MOTORS LIMITED, Tokyo (JP)

(72) Inventor: Yoshihisa Fukuda, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 173 days.

(21) Appl. No.: 17/251,380

(22) PCT Filed: Jun. 12, 2019

(86) PCT No.: PCT/JP2019/023254
§ 371 (c)(1),
(2) Date: Dec. 11, 2020

(87) PCT Pub. No.: WO2019/240161
PCT Pub. Date: Dec. 19, 2019

(65) Prior Publication Data
US 2021/0254701 A1    Aug. 19, 2021

(30) Foreign Application Priority Data
Jun. 13, 2018 (JP) .............................. JP2018-112413

(51) Int. Cl.
*G01M 13/021* (2019.01)
*F16H 57/01* (2012.01)
*F16H 57/04* (2010.01)

(52) U.S. Cl.
CPC .......... *F16H 57/01* (2013.01); *G01M 13/021* (2013.01); *F16H 57/04* (2013.01); *F16H 2057/012* (2013.01)

(58) Field of Classification Search
CPC ............................ G01M 13/021; F16H 57/01
See application file for complete search history.

(56) References Cited

U.S. PATENT DOCUMENTS

2004/0216530 A1* 11/2004 Kwon ................. G01N 3/32
73/808
2014/0007657 A1    1/2014 Matsubara et al.
(Continued)

FOREIGN PATENT DOCUMENTS

| CN | 101319966 A | 12/2008 |
| CN | 104582912 A | 4/2015 |

(Continued)

OTHER PUBLICATIONS

The State Intellectual Property Office of People's Republic of China, The First Office Action, Application No. CN201980039956.3, dated May 24, 2022, in 19 pages.
(Continued)

*Primary Examiner* — Eric S. McCall
(74) *Attorney, Agent, or Firm* — Procopio, Cory, Hargreaves & Savitch LLP

(57) ABSTRACT

An estimation device includes mixed amount acquisition part 110, 201 configured to acquire a foreign matter mixed amount in a fluid that lubricates meshing elements G1 to G4, a fatigue damage degree estimation unit 202 configured to estimate fatigue damage degrees received by the meshing elements G1 to G4 per unit traveling of a vehicle based on the acquired foreign matter mixed amount, and a cumulative fatigue damage degree estimation unit 203 configured to estimate cumulative fatigue damage degrees of the meshing elements G1 to G4 based on the estimated fatigue damage degrees and at least one of a traveling distance and traveling time of the vehicle.

13 Claims, 5 Drawing Sheets

(56) References Cited

U.S. PATENT DOCUMENTS

| | | |
|---|---|---|
| 2019/0204182 A1* | 7/2019 | Yamashita ............ F16C 19/522 |
| 2021/0010581 A1* | 1/2021 | Fukuda ................... B60L 50/50 |
| 2021/0125420 A1* | 4/2021 | Tabata ...................... B60L 3/12 |
| 2022/0146374 A1* | 5/2022 | Fujitani ............... G01M 15/048 |
| 2022/0178115 A1* | 6/2022 | Ogasawara ............ G06Q 50/10 |

FOREIGN PATENT DOCUMENTS

| | | |
|---|---|---|
| EP | 2767815 A1 | 8/2014 |
| JP | UM-A-H06-001899 A | 1/1994 |
| JP | 2005227141 A | 8/2005 |
| JP | 2006275929 A | 10/2006 |
| JP | 2009-226488 A | 10/2009 |
| JP | 2009229288 A | 10/2009 |
| JP | 2010175048 A | 8/2010 |
| JP | 2012-181169 A | 9/2012 |
| JP | 2013231673 A | 11/2013 |
| JP | 2015215317 A | 12/2015 |
| JP | 5990729 B1 | 11/2016 |
| JP | 2016197062 A | 11/2016 |
| WO | 2013-162039 A1 | 4/2013 |

OTHER PUBLICATIONS

International Search Report and Written Opinion for related PCT App No. PCT/JP2019/023254 dated Aug. 27, 2019, 8 pgs. (partial translation).

* cited by examiner

FATIGUE DAMAGE DEGREE ESTIMATION DEVICE AND METHOD

CROSS-REFERENCE TO RELATED APPLICATIONS

This application is a U.S. National Stage entry of PCT Application No: PCT/JP2019/023254 filed Jun. 12, 2019, which claims priority to Japanese Patent Application No. 2018-112413 filed Jun. 13, 2018, the contents of which are incorporated herein by reference.

TECHNICAL FIELD

The present disclosure relates to an estimation device and an estimation method, and particularly to a technique for estimating a life of a meshing element.

BACKGROUND ART

As an example of this type of device, for example, Patent Literature 1 proposes a technique of predicting a life of gears configuring a power transmission device mounted on a vehicle based on a torque input to each gear from a traveling motor, and appropriately notifying a driver of an appropriate gear replacement time.

CITATION LIST

Patent Literature

Patent Literature 1: JP-A-2013-231673

SUMMARY OF INVENTION

Technical Problem

In the power transmission device, since the gears or the like are worn, foreign matter, such as metal powders and broken pieces, generated due to the wear is mixed in lubricating oil. When the foreign matter mixed amount is too large, and the gears or the like are broken, on-road failures of a vehicle may be caused. Therefore, it is desired to prevent the on-road failures of the vehicle in advance by appropriately estimating gear breakage time (for example, a cumulative fatigue damage degree) corresponding to the foreign matter mixed amount in the lubricating oil, and notifying the driver of the appropriate gear replacement time.

An object of a technique of the present disclosure is to effectively estimate breakage time of a meshing element corresponding to a foreign matter mixed amount in a fluid.

Solution to Problem

A device of the present disclosure includes: mixed amount acquisition means for acquiring a foreign matter mixed amount in a fluid that lubricates a meshing element; fatigue damage degree estimation means for estimating a fatigue damage degree received by the meshing element per unit traveling of a vehicle based on the acquired foreign matter mixed amount; and cumulative fatigue damage degree estimation means for estimating a cumulative fatigue damage degree of the meshing element based on the estimated fatigue damage degree and at least one of a traveling distance and traveling time of the vehicle.

It is preferable that the device further includes: warning means for notifying that the estimated cumulative fatigue damage degree has reached a predetermined threshold indicating a possibility of breakage of the meshing element when the estimated cumulative fatigue damage degree has reached the predetermined threshold indicating the possibility of breakage of the meshing element.

It is preferable that the mixed amount acquisition means includes: collection means including a collection member that is provided in a flow path in which a fluid flows and is configured to collect foreign matter in the fluid by passing the fluid through at least a part thereof, the collection means being moved in a fluid flowing direction with accumulation of the foreign matter in the collection member movement amount acquisition means for acquiring a movement amount of the collection means in the fluid flowing direction; and mixed amount estimation means for estimating the foreign matter mixed amount in the fluid based on the acquired movement amount.

It is preferable that the mixed amount acquisition means further includes biasing means for biasing the collection means in a direction opposite to the fluid flowing direction, and the collection means moves in the fluid flowing direction against a biasing force of the biasing means with the accumulation of the foreign matter in the collection member.

The collection means may be a strainer member that is formed in a cylindrical shape with a bottom by a mesh member capable of collecting the foreign matter in the fluid, and a cylinder opening side of the strainer member may be directed to an upstream side in the fluid flowing direction.

It is preferable that the cumulative fatigue damage degree estimation means estimates the cumulative fatigue damage degree according to Miner's rule or modified Miner's rule based on the fatigue damage degree and the at least one of the traveling distance and the traveling time.

A method of the present disclosure includes: acquiring a foreign matter mixed amount in a fluid that lubricates a meshing element; estimating a fatigue damage degree received by the meshing element per unit traveling of a vehicle based on the acquired foreign matter mixed amount; and estimating a cumulative fatigue damage degree of the meshing element based on the estimated fatigue damage degree and at least one of a traveling distance and traveling time of the vehicle.

Advantageous Effects of Invention

According to the technique of the present disclosure, the breakage time of the meshing element corresponding to the foreign matter mixed amount in the fluid can be effectively estimated.

DESCRIPTION OF EMBODIMENTS

Figure 1:
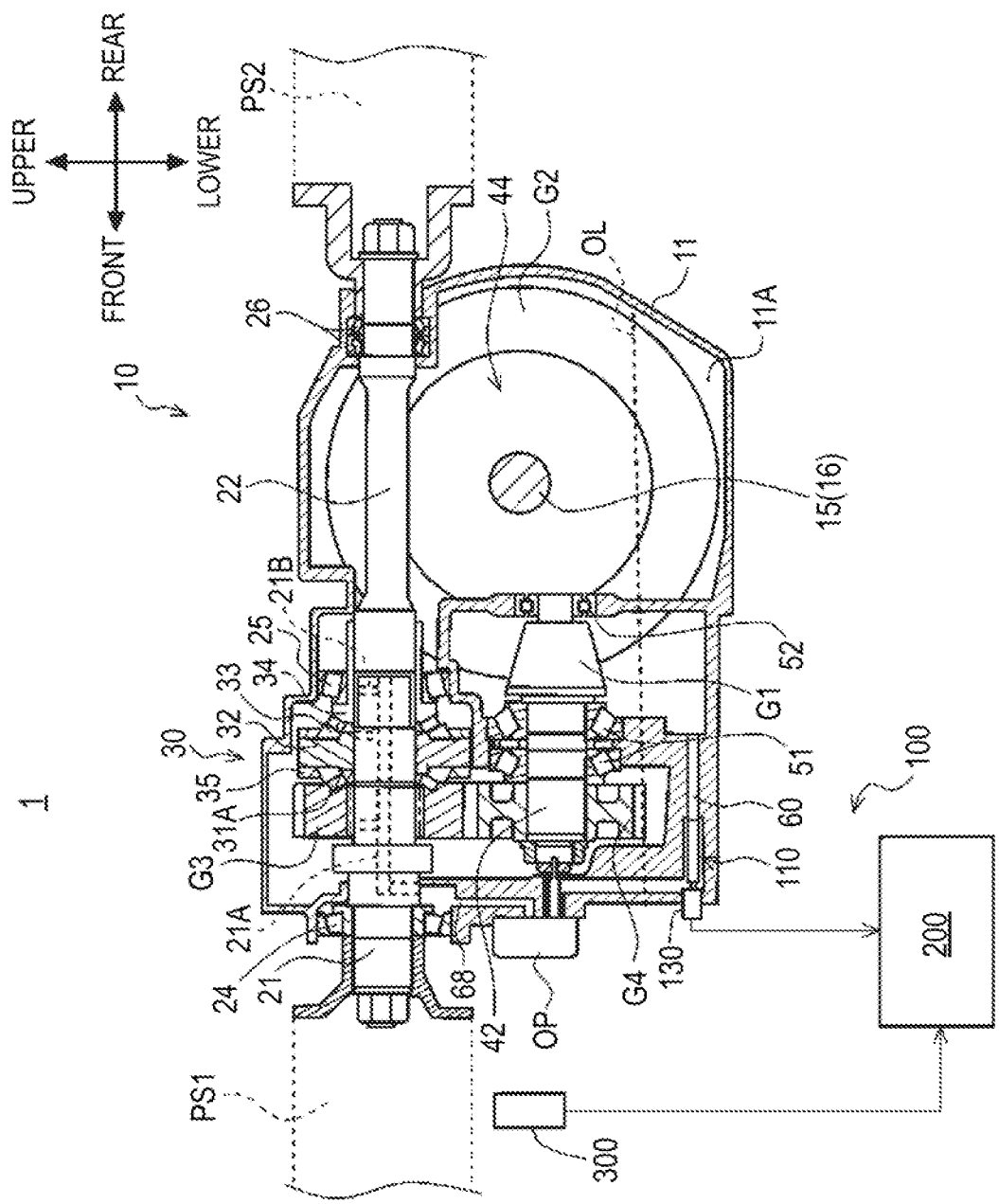
FIG. 1 is a schematic vertical cross-sectional view of a power transmission device mounted on a vehicle according to the present embodiment.

Hereinafter, an estimation device and an estimation method according to the present embodiment will be described with reference to the accompanying drawings. The same components are denoted by the same reference numerals, and names and functions of these components are also the same. Therefore, detailed descriptions of the same components are not repeated.

[Power Transmission Device]

FIG. 1 is a schematic vertical cross-sectional view of a power transmission device 10 mounted on a vehicle according to the present embodiment. As illustrated in FIG. 1, the power transmission device 10 is a final drive device mounted on a rear biaxial drive vehicle including two drive shafts (rear front-axle and rear rear-axle) as rear axles. The vehicle may be any of a rear uniaxial drive vehicle, a front-wheel drive vehicle, a four-wheel drive vehicle, and the like. The power transmission device 10 is not limited to a final drive device, and may be other power transmission devices such as a transfer device and a transmission.

The final drive device 10 includes a housing 11. In a bottom portion 11A of the housing 11, lubricating oil as an example of a fluid (a schematic liquid level OL in the drawing is indicated by a broken line) is stored. The final drive device 10 includes an input shaft 21, an output shaft 22, a drive pinion 42, and a gear mechanism 30.

The input shaft 21 is rotatably supported by the housing 11 via a bearing 24. An output end of a propeller shaft PSI to which a driving force is transmitted from a transmission or the like (not illustrated) is connected to the input shaft 21. Reference numeral 3W) indicates a vehicle speed sensor that acquires a vehicle speed V from the rotation of the propeller shaft PSI. The vehicle speed acquired by the vehicle speed sensor 300 is input to an electronic control unit 200 electrically connected thereto.

The output shaft 22 is disposed coaxially with the input shaft 21, and is rotatably supported by the housing 11 via bearings 25, 26. An input end of a propeller shaft S2 that transmits a driving force to a rear mar-axle (not illustrated) is connected to the output shaft 22.

The drive pinion 42 is disposed in the housing 11 in parallel to the input shaft 21, and is rotatably supported by the housing 11 via bearings 51, 52. A drive pinion gear G1 is provided on one end of the drive pinion 42, and a ring gear G2 meshes with the drive pinion gear G1. The ring gear G2 is fixed to a differential cage (not illustrated) configuring a part of a rear-front differential mechanism 44. The rear-front differential mechanism 44 includes a differential cage, a side gear, a differential pinion gear, a spider, or the like (all are not illustrated), and transmits a driving force to left and right drive shafts 15, 16 (the right drive shaft 16 is not illustrated) while allowing the differential.

The gear mechanism 30 transmits the driving force transmitted to the input shaft 21 to the output shaft 22 and the drive pinion 42 while allowing the differential. Specifically, the gear mechanism 30 includes a gear G3, a spider 32, a pair of pinion gears 33, a side gear 34, and a cage 35. The gear G3 is relatively rotatable around the input shaft 21 and meshes with a gear G4 fixed to the drive pinion 42. Further, a side gear 31A of the gear G3 meshes with the pair of pinion gears 33. The side gear 34 is integrally rotatably fixed to the output shaft 22, and meshes with the pair of pinion gears 33.

The pair of pinion gears 33 are rotatably inserted into the spider 32. The spider 32 is fixed to the cage 35 that is integrally rotatable with the input shaft 21.

An oil pump OP that pumps up and pressure-feeds the lubricating oil stored in the bottom portion 11A of the housing 11 is provided on a side portion of the housing 11. The oil pump OP is, for example, a gear pump or a trochoid pump, and is driven by power transmitted from the drive pinion 42.

A downstream oil passage 60 that allows the bottom portion 11A for storing the lubricating oil to communicate with a suction port of the oil pump OP is provided inside the housing 11. An upstream oil passage 68 that allows a discharge port of the oil pump OP to communicate with an axial oil passage 21A formed in the input shaft 21 is provided inside the housing 11. When the oil pump OP is driven, the lubricating oil in the bottom portion 11A is pumped up through the downstream oil passage 60 and pressure-fed to the upstream oil passage 68. The lubricating oil that is pressure-fed to the upstream oil passage 68 is supplied to lubrication elements such as bearings via the axial oil passage 21A and a plurality of radial oil passages 21B in the input shaft 21 and returns to the bottom portion 11A to circulate.

The estimation device 100 includes a foreign matter mixed amount detection part 110 (an example of mixed amount acquisition means) and an electronic control unit 200. In the present embodiment, the foreign matter mixed amount detection part 110 is provided in the downstream oil passage 60. Hereinafter, details of the foreign matter mixed amount detection part 110 will be described.

[Foreign Matter Mixed Amount Detection Part]

Figure 2A:
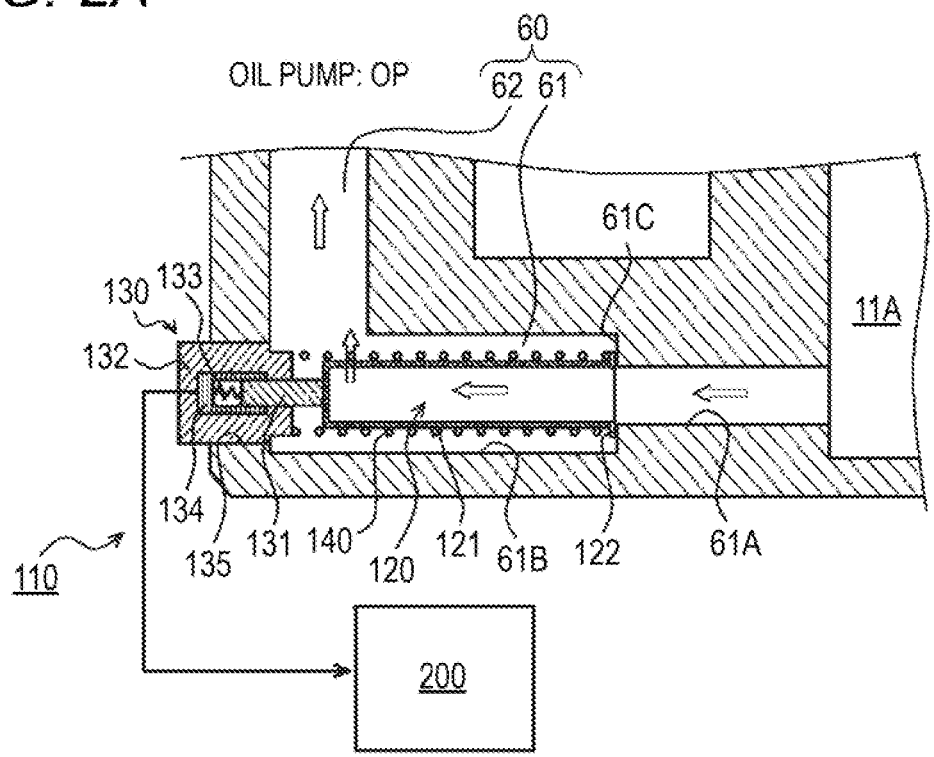
FIG. 2A is a schematic partial cross-sectional view illustrating a foreign matter mixed amount detection part according to the present embodiment.
Figure 2B:
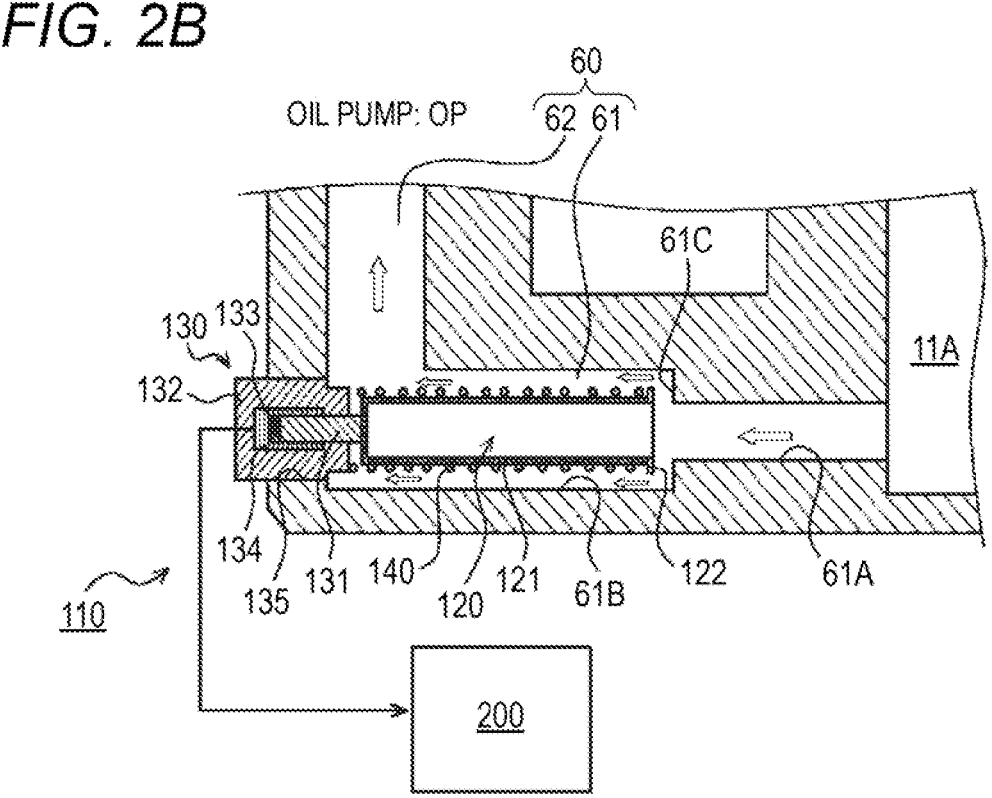
FIG. 2B is a schematic partial cross-sectional view illustrating the foreign matter mixed amount detection part according to the present embodiment.

FIGS. 2A and 28 are schematic partial cross-sectional views illustrating the foreign matter mixed amount detection part 110 according to the present embodiment. As illustrated in FIGS. 2A and 2B, the foreign matter mixed amount detection part 110 includes a strainer 120 (collecting means), a stroke sensor 130 (movement amount acquisition means), and a spring 140 (biasing means). Among these components, the strainer 120, a part of the stroke sensor 130, and the spring 140 are disposed in the downstream oil passage 60.

The downstream oil passage 60 is bent in a substantially L shape, and includes a lateral flow path 61 extending laterally from the bottom portion 11A of the housing 11, and a vertical flow path 62 extending vertically from a downstream end of the lateral flow path 61 to an oil pump OP side. The lateral flow path 61 includes a small-diameter flow path portion 61A on an upstream side and a large-diameter flow path portion 61B on a downstream side, and an annular stepped surface 61C is formed between the small-diameter flow path portion 61A and the large-diameter flow path portion 61B.

The strainer 120 includes a strainer body portion 121 (collection member) formed in an approximately cylindrical shape with a bottom by a mesh member that passes lubricating oil and can collect the foreign matter (for example, iron powders and broken pieces generated due to wear of gears: hereinafter, simply referred to as foreign matter) contained in the lubricating oil. A cylinder axial length of the strainer body portion 121 is shorter than a flow path axial length of the large-diameter flow path portion 61B. The strainer body portion 121 is accommodated in the large-diameter flow path portion 61B in a manner of being movable in a flowing direction of the lubricating oil. An annular flange portion 122 that is bent radically outward at a substantially right angle is provided at a peripheral edge of an opening of the strainer body portion 121.

An inner diameter of the flange portion 122 and an inner diameter of the strainer body portion 121 are preferably formed to be substantially equal to a flow path diameter of the small-diameter flow path portion 61A. An outer diameter of the flange portion 122 is formed to be smaller than a flow path diameter of the large-diameter flow path portion 61B. The flange portion 122 is disposed in a press-contact state with the stepped surface 61C by a biasing force of the spring 140.

The stroke sensor 130 includes a shaft 131 that abuts against a cylinder bottom outer surface of the strainer body portion 121, a bottomed cylindrical casing 132 that supports the shaft 131 in a stroke movable manner, a return spring 133 (biasing means) that causes the shaft 131 to return to an original position, and a detection element part 134 that detects a stroke movement amount S of the shaft 131 corresponding to a movement amount of the strainer 120. The stroke movement amount S detected by the detection element part 134 is input to the electronic control unit 200 that is electronically connected to the detection element part 134.

In the present embodiment, the stroke sensor 130 is detachably attached to the housing 11 by screwing a male screw portion (not illustrated) formed on an outer periphery of the casing 132 into a female screw portion (not illustrated) formed on an inner periphery of a through hole 135 of the housing 11. The strainer 120 is configured to be capable of being periodically replaced (including reused) by removing the stroke sensor 130 from the housing 11.

One end side of the spring 140 is disposed on the flange portion 122, and the other end side thereof is disposed on a cylindrical end surface of the casing 132, and the spring 140 is held in a compressed state between the flange portion 122 and the casing 132.

When the foreign matter mixed amount in the lubricating oil is small (or substantially zero), the foreign matter amount collected on an inner cylindrical surface of the strainer body portion 121 (degree of clogging) is also small, and flow resistance for the lubricating oil passing through the strainer body portion 121 is small. In this case, as illustrated in FIG. 2A, the strainer 120 is held in a state in which the flange portion 122 is disposed on the stepped surface 61C by a biasing force of the spring 140, and the shat 131 of the stroke sensor 130 is also held at a substantially original position. That is, the stroke movement amount S of the shaft 131 detected by the stroke sensor 130 is substantially zero.

When the foreign matter mixed amount in the lubricating oil is increased and the foreign matter starts to accumulate on the inner cylindrical surface of the strainer body portion 121, the degree of clogging of the strainer body portion 121 is increased. As a result, the flow resistance for the lubricating oil passing through the strainer body portion 121 is gradually increased. Then, as illustrated in FIG. 2B, the strainer 120 performs stroke-movement in a flow direction of the lubricating oil against the biasing force of the spring 140. When the strainer 120 performs stroke-movement, lubricating oil flowing through the small-diameter flow path portion 61A flows through a gap between the flange portion 122 and the stepped surface 61C and flows in the large-diameter flow path portion 61B.

At this time, the stroke movement amount S of the shaft 131 detected by the stroke sensor 130 gradually increases in accordance with the movement of the strainer 120. In particular, just before the occurrence of a failure such as breakage of gears or the like, the foreign matter mixed amount in the lubricating oil is increased rapidly, and the flow resistance for the lubricating oil passing through the strainer body portion 121 is also increased rapidly accordingly. As a result, the stroke movement amount S of the shaft 131 and the strainer 120 significantly increases.

In the present embodiment, a change in the stroke movement amount S of the strainer 120 corresponding to the foreign matter accumulation is used to estimate the foreign matter mixed amount in the lubricating oil and the cumulative fatigue damage degree in each of the gears G1 to G4 corresponding to the foreign matter mixed amount. Hereinafter, the processing of estimating the foreign matter fixing amount and the cumulative fatigue damage degree by the electronic control unit 200 will be described in detail.

[Electronic Control Unit]

Figure 3:
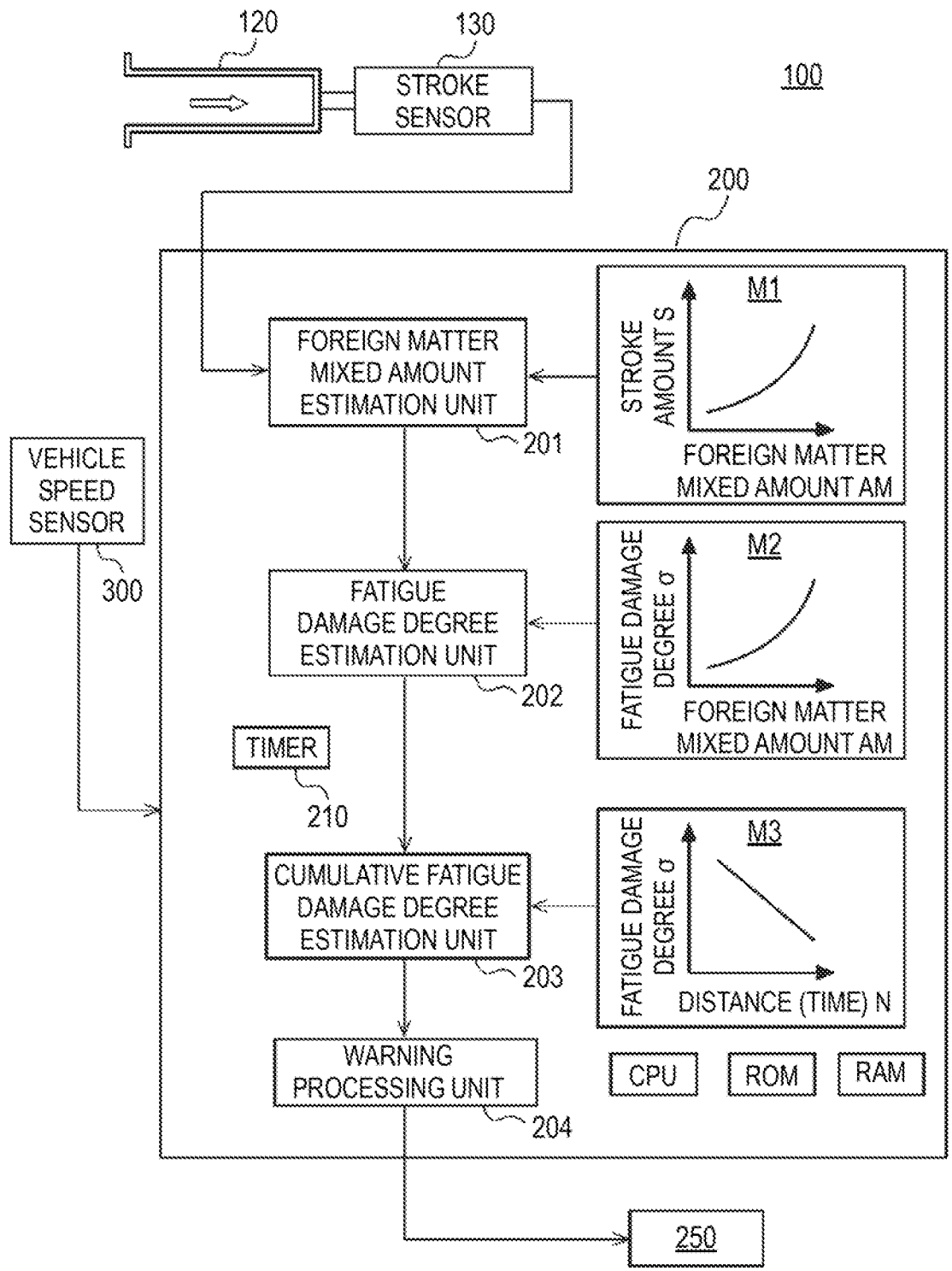
FIG. 3 is a schematic functional block diagram of an electronic control unit according to the present embodiment.

FIG. 3 is a schematic functional block diagram of the electronic control unit 200 according to the present embodiment. The electronic control unit 200 performs various types of control of a vehicle, and includes a CPU, a ROM, a RAM, an input port, an output port, and the like, which are known. Further, the electronic control unit 200 includes a foreign matter mixed amount estimation unit 201 (mixed amount estimation means), a fatigue damage degree estimation unit 202 (fatigue damage degree estimation means), a cumulative fatigue damage degree estimation unit 203 (cumulative fatigue damage degree estimation means), and a warning processing unit 204 (warning means) as part of functional elements. Although each of these functional elements is described as being included in the electronic control unit 200 which is integrated hardware, any one of the functional elements may be provided in separate hardware.

The foreign matter mixed amount estimation unit 201 estimates a foreign matter mixed amount AM in the lubricating oil based on the stroke movement amount S of the strainer 120. Specifically, a memory of the electronic control unit 200 stores a map M1 defining a relationship between the stroke movement amount S of the strainer 120 and the foreign matter mixed amount AM in the lubricating oil, which is created in advance by experiments or the like. In the map M1, the foreign matter mixed amount AM is set to rapidly increase as the stroke movement amount S increases. The foreign matter mixed amount estimation unit 201 estimates the foreign matter mixed amount AM by referring to the map M1 based on the stroke movement amount S input from the stroke sensor 130. The method for estimating the foreign matter mixed amount AM is not limited to the map M1, and the foreign matter mixed amount AM may be calculated from a model formula including the stroke movement amount S as an input value.

The fatigue damage degree estimation unit 202 estimates a fatigue damage degree a received by each of the gears G1 to G4 (see FIG. 1) of the final drive device 10 per unit traveling of the vehicle based on the foreign matter mixed amount AM estimated by the foreign matter mixed amount estimation unit 201. Specifically, the memory of the electronic control unit 200 stores a map M2 defining a relationship between the foreign matter mixed amount AM and the fatigue damage degree C. received by each of the gears G1 to G4 per unit traveling of the vehicle, which is created in advance by experiments or the like. Although only one map M2 is shown in FIG. 3, maps corresponding to respective gears G1 to G4 are provided. In the map M2, the fatigue damage degree a received by each of the gears G1 to G4 is set to rapidly increase as the foreign matter mixed amount AM increases. The fatigue damage degree estimation unit 202 estimates the fatigue damage degree σ received by each of the gears G1 to G4 by referring to the map M2 based on the foreign matter mixed amount AM estimated by the foreign matter mixed amount estimation unit 201. The method for estimating the fatigue damage degree σ is not limited to the map M2, and may be calculated from a model formula or the like including the foreign matter mixed amount AM as an input value.

Figure 4:
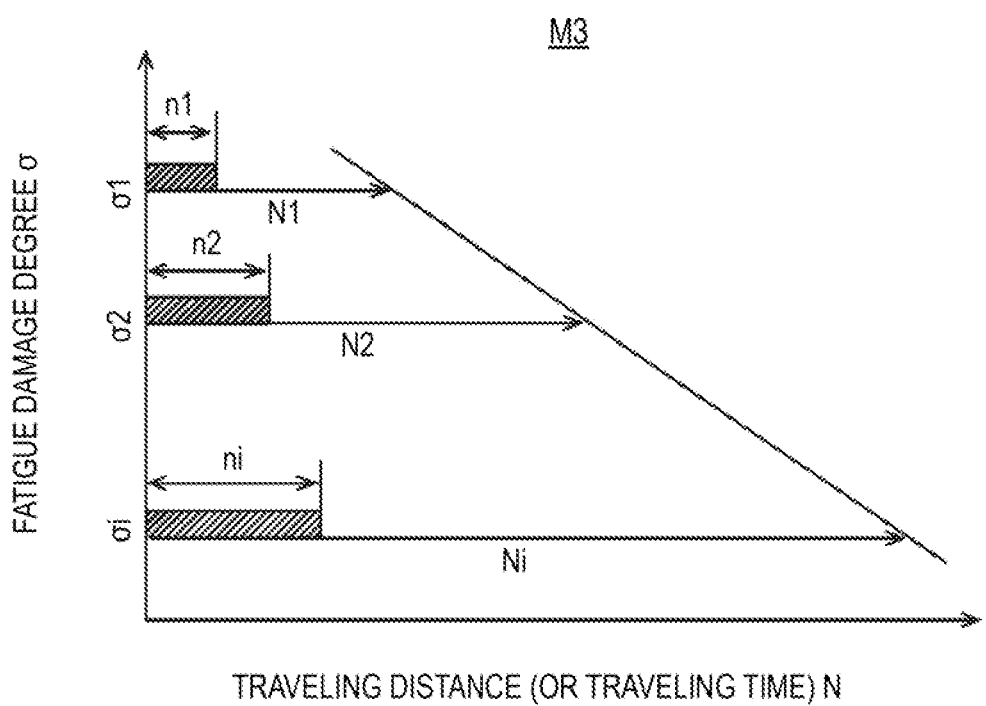
FIG. 4 is a schematic diagram illustrating an S-N diagram according to the present embodiment.

The cumulative fatigue damage degree estimation unit 203 estimates a cumulative fatigue damage degree D of each gear G1 to G4 based on Miner's rule or modified Miner's rule that accumulates damage even for a stress amplitude that is equal to or below the fatigue limit. More specifically, an S-N diagram M3 (see FIG. 4 for details) of each gear G1 to G4 created in advance by an experiment or the like is stored in the memory of the electronic control unit 200. Although only one S-N diagram M3 is shown in FIG. 3. S-N diagrams corresponding to respective gears G1 to G4 are provided. In the S-N diagram M3, the fatigue damage degree a is set in a vertical axis, and at least one of a traveling distance N and traveling time N is set in a horizontal axis.

The cumulative fatigue damage degree estimation unit 203 calculates the cumulative fatigue damage degree D of each of the gears G1 to G4 in real time from the following mathematical formula (1) based on a fatigue damage degree σi input from the fatigue damage degree estimation unit 202, at least one of a traveling distance ni and traveling time ni, and fatigue fracture limits Ni of the gears G1 to G4 read from the S-N diagram M3. The traveling distance ni of the vehicle may be obtained by multiplying a sensor value of the vehicle speed sensor 300 by a timer value of a timer 210 built in the electronic control unit 200. Further, the traveling time ni of the vehicle may be acquired by accumulating the timer values of the timer 210 when the vehicle is traveling.

[Formula 1]

$$D = \frac{n_1}{N_1} + \frac{n_2}{N_2} + \ldots + \frac{n_i}{N_i} = \sum \frac{n_i}{N_i} \quad (1)$$

For the gears G1 to G4 of which the cumulative fatigue damage degree D reaches a predetermined threshold (for example, 0.9 or the like) close to the breakage time (D=1) among the cumulative fatigue damage degrees D of the respective gears G1 to G4 calculated by the cumulative fatigue damage degree estimation unit 203, the warning processing unit 204 outputs an instruction signal of causing a display 250 in a cab to display that the gears G1 to G4 need to be replaced (or that there is a high possibility of breakage). The waning method is not limited to the display on the display 250, and may be performed by sound from a speaker or the like (not illustrated).

Figure 5:
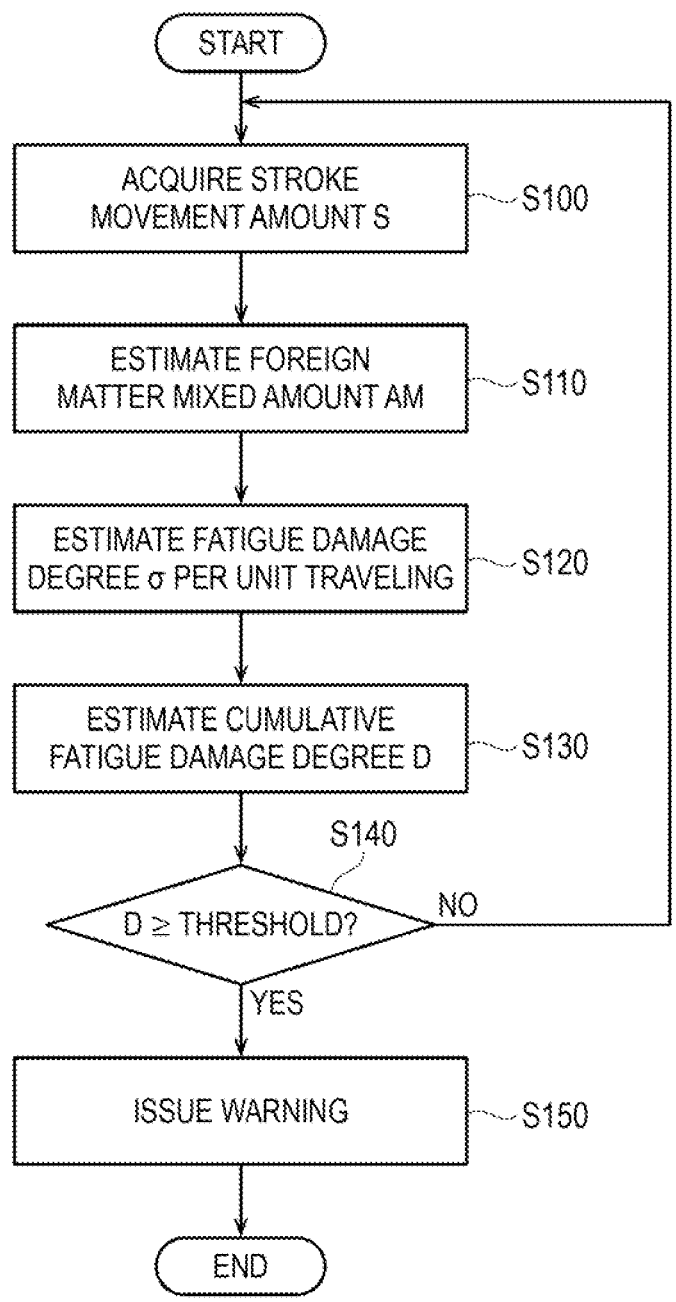
FIG. 5 is a flow chart illustrating processing of estimating the foreign matter mixed amount and a cumulative fatigue damage degree according to the present embodiment.

Next, a flow of the processing of estimating the foreign matter mixed amount and the cumulative fatigue damage degree according to the present embodiment will be described based on FIG. 5.

In step S100, the stroke movement amount S of the strainer 120 is acquired by the stroke sensor 130, and in step S110, the foreign matter mixed amount AM is estimated based on the acquired stroke movement amount S. Next, in step S120, the fatigue damage degree σi received by each of the gears G1 to G4 is estimated based on the estimated foreign matter mixed amount AM.

In step S130, the cumulative fatigue damage degree D of each of the gears G1 to G4 is estimated from Formula (1) based on the fatigue damage degree σi, at least one of the traveling distance ni and the traveling time ni, and the fatigue fracture limit Ni read from the S-N diagram M3.

In step S140, it is determined whether the cumulative fatigue damage degree D of each of the gears G1 to G4 has reached the predetermined threshold (for example, 0.9 or the like). If No, the control is returned to step S1t), and if Yes, the processing proceeds to step S150.

In step S150, for the gears G1 to G4 whose cumulative fatigue damage degree D has reached the predetermined threshold, an warning of causing the display 250 to display that the gears G1 to G4 need to be replaced (or that there is a high possibility of breakage) is issued, and then this control ends.

According to the present embodiment described in detail, the foreign matter mixed amount AM in the lubricating oil is estimated from the stroke movement amount S of the strainer 120 that collects the foreign matter in the lubricating oil, and the fatigue damage degree σi received by each of the gears G1 to G4 is estimated based on the estimated foreign matter mixed amount AM. Then, the cumulative fatigue damage degree D of each of the gears G1 to G4 is estimated based on the fatigue damage degree oi, at least one of the traveling distance ni and the traveling time ni, and the fatigue fracture limit Ni read from the S-N diagram M3, and for the gears G1 to G4 whose cumulative fatigue damage degree D has reached the predetermined threshold, the warning of notifying that the gears G1 to G4 need to be replaced is issued. Accordingly, it is possible to appropriately notify the driver of the replacement time of the gears G1 to G4 which may be broken, and it is possible to prevent an on-road failure of the vehicle caused by the breakage of the gears G1 to G4.

In particular, since a progress degree of mixing of the foreign matter in the lubricating oil varies every moment depending on a driving state of the vehicle, such as driving frequency of the vehicle and the magnitude of the input load to the gears G1 to G4, the failure of the gears G1 to G4 may not be prevented in advance only by uniformly setting maintenance time based on the travel distance or the like. In the present embodiment, since the fatigue damage degree σi received by each of the gears G1 to G4 is acquired from the foreign matter mixed amount AM estimated in real time, and the warning is given based on the cumulative fatigue damage degree D calculated from the fatigue damage degree σi, it is possible to effectively deal with such changes in driving situations, and it is possible to reliably detect a sign of a failure in each of the gears G1 to G4.

The present disclosure is not limited to the above described embodiment and can be appropriately modified and implemented without departing from the spirit of the present disclosure.

For example, the spring 140 of the foreign matter mixed amount detection part 110 is not essential, and the spring 140 may be omitted if the return spring 133 in the sensor has a certain reaction force.

Further, although the strainer 120 is described as being provided in the downstream oil passage 60, the strainer 120 may be disposed in another oil passage of the final drive device 10, such as the upstream oil passage 68.

Further, the mixed amount acquisition means is not limited to the foreign matter mixed amount detection part 110 of the illustrated example, and sensors or the like capable of detecting the foreign matter mixed amount in the fluid by another method may be used.

Further, an application range of the present embodiment is not limited to the power transmission device such as the final drive device, the transfer device, and the transmission, and may also be widely applied to devices in which the lubricating oil is circulated, such as an engine, or other devices in which a fluid other than the lubricating oil circulates, as long as the device includes a gear case filled with the lubricating oil.

The present disclosure includes the following aspects.

In a first aspect, there is provided an estimation device including:

a foreign matter mixed amount detection part configured to detect a value related to a foreign matter mixed amount in a fluid that lubricates a meshing element; and a controller, wherein the controller is configured to:

estimate a fatigue damage degree received by the meshing element per unit traveling of a vehicle based on the value related to the foreign matter mixed amount detected by the foreign matter mixed amount detection part; and estimate a cumulative fatigue damage degree of the meshing element based on the estimated fatigue damage degree and at least one of a traveling distance and traveling time of the vehicle.

[2] In a second aspect, there is provided the estimation device according to the first aspect, wherein the controller is further configured to output a signal notifying that the estimated cumulative fatigue damage degree has reached a predetermined threshold indicating a possibility of breakage of the meshing element when the estimated cumulative fatigue damage degree has reached the predetermined threshold indicating the possibility of breakage of the meshing element.

[3] In a third aspect, there is provided the estimation device according to the first or second aspect, wherein the foreign matter mixed amount detection part includes:

a collection part including a collection member provided in a flow path in which a fluid flows and configured to collect foreign matter in the fluid by passing the fluid through at least a part thereof, the collection part being moved in a fluid flowing direction with accumulation of the foreign matter in the collection member; and a movement amount acquisition part configured to acquire a movement amount of the collection part in the fluid flowing direction, wherein the acquired movement amount is the value related to the foreign matter mixed amount, and wherein the controller is configured to estimate the foreign matter mixed amount in the fluid based on the acquired movement amount and estimate the fatigue damage degree received by the meshing element per unit traveling of a vehicle based on the estimated foreign matter mixed amount.

[4] In a fourth aspect, there is provided the estimation device according to the third aspect, wherein the foreign matter mixed amount detection part further includes a biasing member configured to bias the collection pan in a direction opposite to the fluid flowing direction, and the collection part is configured to move in the fluid flowing direction against a biasing force of the biasing member with the accumulation of the foreign matter in the collection member.

[5] In a fifth aspect, there is provided the estimation device according to the third or fourth aspect, wherein the collection part is a strainer member that is formed in a cylindrical shape with a bottom by a mesh member capable of collecting the foreign matter in the fluid, a cylinder opening side of the strainer member being directed to an upstream side in the fluid flowing direction.

[6] In a sixth aspect, there is provided the estimation device according to any one of the first to the fifth aspects, wherein the controller is configured to estimate the cumulative fatigue damage degree according to Miner's rule or modified Miner's rule based on the fatigue damage degree and the at least one of the traveling distance and the traveling time.

The present application is based on Japanese Patent Application (No. 2018-112413) filed on Jun. 13, 2018, contents of which are incorporated herein as reference.

INDUSTRIAL APPLICABILITY

The estimation device and the estimation method of the present invention are useful in that the breakage time of the meshing element can be effectively estimated according to the foreign matter mixed amount in the fluid.

REFERENCE SIGNS LIST

10 final drive device
100 estimation device
110 foreign matter mixed amount detection part (mixed amount acquisition means)
120 strainer (collecting means)
121 strainer body portion (collecting member)
130 stroke sensor (movement amount acquisition means)
140 spring (biasing means)
200 electronic control unit
201 foreign matter mixed amount estimation unit (mixed amount estimation means)
202 fatigue damage degree estimation unit (fatigue damage degree estimation means)
203 cumulative fatigue damage degree estimation unit (cumulative fatigue damage degree estimation means)
204 warning processing unit (warning means)
250 display (warning means)

The invention claimed is:

1. An estimation device comprising:
mixed amount acquisition means for acquiring a foreign matter mixed amount in a fluid that lubricates a meshing element;
fatigue damage degree estimation means for estimating a fatigue damage degree received by the meshing element per unit traveling of a vehicle based on the acquired foreign matter mixed amount; and
cumulative fatigue damage degree estimation means for estimating a cumulative fatigue damage degree of the meshing element based on the estimated fatigue damage degree and at least one of a traveling distance and traveling time of the vehicle.

2. The estimation device according to claim 1, further comprising:
warning means for notifying that the estimated cumulative fatigue damage degree has reached a predetermined threshold indicating a possibility of breakage of the meshing element when the estimated cumulative fatigue damage degree has reached the predetermined threshold indicating the possibility of breakage of the meshing element.

3. The estimation device according to claim 1,
wherein the cumulative fatigue damage degree estimation means estimates the cumulative fatigue damage degree according to Miner's rule or modified Miner's rule based on the fatigue damage degree and the at least one of the traveling distance and the traveling time.

4. The estimation device according to claim 1,
wherein the mixed amount acquisition means includes:
- collection means including a collection member that is provided in a flow path in which a fluid flows and is configured to collect foreign matter in the fluid by passing the fluid through at least a part thereof, the collection means being moved in a fluid flowing direction with accumulation of the foreign matter in the collection member;
- movement amount acquisition means for acquiring a movement amount of the collection means in the fluid flowing direction, and
- mixed amount estimation means for estimating the foreign matter mixed amount in the fluid based on the acquired movement amount.

5. The estimation device according to claim 4,
wherein the mixed amount acquisition means further includes biasing means for biasing the collection means in a direction opposite to the fluid flowing direction, and the collection means moves in the fluid flowing direction against a biasing force of the biasing means with the accumulation of the foreign matter in the collection member.

6. The estimation device according to claim 4,
wherein the collection means is a strainer member that is formed in a cylindrical shape with a bottom by a mesh member capable of collecting the foreign matter in the fluid, a cylinder opening side of the strainer member being directed to an upstream side in the fluid flowing direction.

7. An estimation method comprising:
acquiring a foreign matter mixed amount in a fluid that lubricates a meshing element;
estimating a fatigue damage degree received by the meshing element per unit traveling of a vehicle based on the acquired foreign matter mixed amount; and
estimating a cumulative fatigue damage degree of the meshing element based on the estimated fatigue damage degree and at least one of a traveling distance and traveling time of the vehicle.

8. An estimation device comprising:
a foreign matter mixed amount detection part configured to detect a value related to a foreign matter mixed amount in a fluid that lubricates a meshing element; and
a controller,
wherein the controller is configured to:
- estimate a fatigue damage degree received by the meshing element per unit traveling of a vehicle based on the value related to the foreign matter mixed amount detected by the foreign matter mixed amount detection part; and
- estimate a cumulative fatigue damage degree of the meshing element based on the estimated fatigue damage degree and at least one of a traveling distance and traveling time of the vehicle.

9. The estimation device according to claim 8,
wherein the controller is further configured to output a signal notifying that the estimated cumulative fatigue damage degree has reached a predetermined threshold indicating a possibility of breakage of the meshing element when the estimated cumulative fatigue damage degree has reached the predetermined threshold indicating the possibility of breakage of the meshing element.

10. The estimation device according to claim 8,
wherein the controller is configured to estimate the cumulative fatigue damage degree according to Miner's rule or modified Miner's rule based on the fatigue damage degree and the at least one of the traveling distance and the traveling time.

11. The estimation device according to claim 8,
wherein the foreign matter mixed amount detection part includes:
- a collection part including a collection member provided in a flow path in which a fluid flows and configured to collect foreign matter in the fluid by passing the fluid through at least a part thereof, the collection part being moved in a fluid flowing direction with accumulation of the foreign matter in the collection member; and
- a movement amount acquisition part configured to acquire a movement amount of the collection part in the fluid flowing direction,
wherein the acquired movement amount is the value related to the foreign matter mixed amount, and
wherein the controller is configured to estimate the foreign matter mixed amount in the fluid based on the acquired movement amount and estimate the fatigue damage degree received by the meshing element per unit traveling of a vehicle based on the estimated foreign matter mixed amount.

12. The estimation device according to claim 11,
wherein the foreign matter mixed amount detection part further includes a biasing member configured to bias the collection part in a direction opposite to the fluid flowing direction, and the collection part is configured to move in the fluid flowing direction against a biasing force of the biasing member with the accumulation of the foreign matter in the collection member.

13. The estimation device according to claim 11,
wherein the collection part is a strainer member that is formed in a cylindrical shape with a bottom by a mesh member capable of collecting the foreign matter in the fluid, a cylinder opening side of the strainer member being directed to an upstream side in the fluid flowing direction.

* * * * *